(12) United States Patent
Elley et al.

(10) Patent No.: US 7,213,262 B1
(45) Date of Patent: May 1, 2007

(54) METHOD AND SYSTEM FOR PROVING MEMBERSHIP IN A NESTED GROUP USING CHAINS OF CREDENTIALS

(75) Inventors: Yassir K. Elley, Cambridge, MA (US);
Anne H. Anderson, Acton, MA (US);
Stephen R. Hanna, Bedford, MA (US);
Sean J. Mullan, Watertown, MA (US);
Radia J. Perlman, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/310,165

(22) Filed: May 10, 1999

(51) Int. Cl.
*H04L 9/32* (2006.01)
*G06F 15/16* (2006.01)
*G06F 17/30* (2006.01)

(52) U.S. Cl. .................. 726/10; 713/157; 713/175; 709/229

(58) Field of Classification Search ........ 713/155–158, 713/182, 200–202, 150, 168, 175; 380/277, 380/278, 286; 707/1.9; 709/200, 227–229
See application file for complete search history.

(56) References Cited

U.S. PATENT DOCUMENTS

| | | |
|---|---|---|
| 4,529,870 A | 7/1985 | Chaum |
| 5,173,939 A | 12/1992 | Abadi et al. ................. 380/25 |
| 5,220,604 A | 6/1993 | Gasser et al. ................. 380/23 |
| 5,224,163 A | 6/1993 | Gasser et al. |
| 5,261,002 A | 11/1993 | Perlman et al. |
| 5,283,830 A | 2/1994 | Hinsley et al. |
| 5,311,591 A | 5/1994 | Fischer |
| 5,315,657 A | 5/1994 | Abadi et al. |
| 5,339,403 A * | 8/1994 | Parker ........................ 711/221 |

(Continued)

FOREIGN PATENT DOCUMENTS

EP 0779570 6/1997

(Continued)

OTHER PUBLICATIONS

Woo et al, "A Framework for Distributed Authorization" Nov. 1993, ACM 1st Conference Computer and Communication Security, p. 112-118.*

(Continued)

*Primary Examiner*—Christopher Revak
(74) *Attorney, Agent, or Firm*—Chapin IP Law, LLC; Barry W. Chapin, Esq.

(57) ABSTRACT

In accordance with the invention, a presenter of credentials presents to a recipient of credentials one or more chains of group credentials to prove entity membership or non-membership in a nested group in a computer network. The ability to present a chain of credentials is particularly important when a client is attempting the prove membership or non-membership in a nested group and one or more of the group servers in the family tree are off-line. A chain of group credentials includes two or more proofs of group membership and/or proofs of group non-membership Furthermore, the proofs of group membership may include one or more group membership certificates and/or one or more group membership lists; and proofs of group non-membership may include one or more group non-membership certificates and/or one or more group membership lists.

64 Claims, 7 Drawing Sheets

U.S. PATENT DOCUMENTS

| | | | |
|---|---|---|---|
| 5,586,260 A | 12/1996 | Hu | |
| 5,687,235 A | 11/1997 | Perlman et al. | |
| 5,757,920 A | 5/1998 | Misra et al. | |
| 5,764,772 A | 6/1998 | Kaufman et al. | |
| 5,768,519 A | 6/1998 | Swift et al. | 709/223 |
| 5,815,574 A * | 9/1998 | Fortinsky | 713/153 |
| 5,825,891 A | 10/1998 | Levesque et al. | |
| 5,826,012 A | 10/1998 | Lettvin | |
| 5,898,784 A | 4/1999 | Kirby et al. | |
| 5,901,227 A * | 5/1999 | Perlman | 713/157 |
| 5,922,074 A | 7/1999 | Richard et al. | |
| 5,983,350 A | 11/1999 | Minear et al. | |
| 5,991,807 A | 11/1999 | Schmidt et al. | |
| 6,047,325 A | 4/2000 | Jain et al. | |
| 6,079,020 A | 6/2000 | Liu | |
| 6,088,805 A | 7/2000 | Davis et al. | |
| 6,092,191 A | 7/2000 | Shimbo et al. | |
| 6,101,543 A | 8/2000 | Alden et al. | |
| 6,134,550 A | 10/2000 | Van Oorschot et al. | |
| 6,138,235 A * | 10/2000 | Lipkin et al. | 713/155 |
| 6,158,011 A | 12/2000 | Chen et al. | |
| 6,212,634 B1 | 4/2001 | Geer et al. | |
| 6,216,231 B1 | 4/2001 | Stubblebien | |
| 6,219,706 B1 | 4/2001 | Fan et al. | |
| 6,223,291 B1 | 4/2001 | Puhl et al. | |
| 6,230,266 B1 | 5/2001 | Perlman et al. | |
| 6,256,741 B1 | 7/2001 | Stubblebine | 713/201 |
| 6,263,434 B1* | 7/2001 | Hanna et al. | 713/156 |
| 6,275,941 B1 | 8/2001 | Saito et al. | |
| 6,301,658 B1* | 10/2001 | Koehler | 713/155 |
| 6,308,274 B1 | 10/2001 | Swift | |
| 6,308,277 B1 | 10/2001 | Vaeth et al. | |
| 6,366,913 B1 | 4/2002 | Fitler et al. | |
| 6,370,648 B1 | 4/2002 | Diep | |
| 6,397,329 B1 | 5/2002 | Aiello et al. | |
| 6,405,313 B1 | 6/2002 | Reiter et al. | |
| 6,408,336 B1 | 6/2002 | Schneider et al. | |
| 6,438,690 B1 | 8/2002 | Patel et al. | |
| 6,463,474 B1 | 10/2002 | Fuh et al. | |
| 6,484,203 B1 | 11/2002 | Porras et al. | |
| 6,490,367 B1 | 12/2002 | Carlsson et al. | |
| 6,496,858 B1 | 12/2002 | Frailong et al. | |
| 6,557,104 B2 | 4/2003 | Vu et al. | |
| 6,754,661 B1 | 6/2004 | Hallin et al. | |
| 6,772,331 B1 | 8/2004 | Hind et al. | |
| 6,801,998 B1* | 10/2004 | Hanna et al. | 713/155 |
| 6,883,100 B1* | 4/2005 | Elley et al. | 726/5 |
| 2002/0144149 A1* | 10/2002 | Hanna et al. | 713/201 |
| 2003/0028585 A1* | 2/2003 | Yeager et al. | 709/201 |
| 2003/0041141 A1* | 2/2003 | Abdelaziz et al. | 709/223 |
| 2003/0055894 A1* | 3/2003 | Yeager et al. | 709/204 |
| 2003/0055898 A1* | 3/2003 | Yeager et al. | 709/205 |
| 2003/0056093 A1* | 3/2003 | Huitema et al. | 713/156 |
| 2004/0054899 A1* | 3/2004 | Balfanz et al. | 713/168 |

FOREIGN PATENT DOCUMENTS

| | | |
|---|---|---|
| EP | 0942568 | 9/1999 |
| WO | 98/10381 | 3/1998 |
| WO | WO 99/41878 | 8/1999 |

OTHER PUBLICATIONS

Kaufman, Charlie et al., "Network Security, Private Communication in a Public World," PTR Prentice Hall, 1995, chapters 5, 7 and 8 pp. 129-161, and pp. 177-222.

Kaufman, Charlie et al., "Network Security, Private Communication in a Public World," PTR Prentice Hall, 1995, pp. 455-459.

Micali, "Enhanced Certificate Revocation System," MIT Laboratory for Computer Science.

Micali, "Efficient Certificate Revocation," MIT Laboratory for Computer Science (Mar. 22, 1996).

Myers et al., "X.509 Internet Public Key Infrastructure Online Certificate Status Protocol OCSP," (Sep. 1998).

Rivest, "Can We Eliminate Certificate Revocation Lists?" MIT Laboratory for Computer Science.

Ryutov et al., "Access Control Framework for Distributed Applications," USC/Information Sciences Institute (Aug. 7, 1998).

Gaul et al., "Mining Generalized Association Rules for Sequential and Path Data," 2001, IEEE, pp. 593-596.

Morrissey, P., "Demystifying Crisco Access Control Lists," Apr. 1998, Network Computing, pp. 116, 118 and 120.

International Search Report completed on Oct. 2, 2002 and mailed Oct. 9, 2002.

Kaufman, Charlie, et al, Network Security, Private Communication in a Public World,PTR Prentice Hall,1995, chapters 5,7 and 8, pp. 129-161, and pp. 177-222.

Kaufman, Charlie, et al, Network Security, Private Communication in a Public World, PTR, Prentice Hall, 1995, pp. 455-459.

Anonymous, "Boot Disk Recovery", http://www.measureup.com/testobjects/MS_NT4W/5a8cbb2.htm, Apr. 21, 1998.

Eastlake, et al., "Domain Name System Security", Network Working Group, Standards Track, Request for Comments 2065, RFC 2065, Jan. 1997, 1-36.

Gaul, et al., "Mining Generalized Association Rules for Sequential and Path Data", IEEE, 2001, 593-596.

Housley, et al., "Network Working Group; Internet X.509", Public Key Infrastructure Certificate and Profile, Jan. 1999.

ITU-Information Technology, "Open Systems Interconnection—The Directory: Authentication Framework, Recommendation X.509", Nov. 1993.

Jerman-Blazic, et al., "A Tool for Support of Key Distribution and Validity Certificate Cherck in Global Directory Service", Computer Networks and ISDN Systems, 1996.

Kaufman, "DASS Distributed Authentication", Network Working Group, Request for Comments 1507, RFC 1507, Sep. 1993, 1-103.

Kent, "Privacy Enhancement for Internet Electronic Mail: Part II: Certificate-Based Key Management", Network Working Group, Request for Comments 1422, Obsoletes 1114, Feb. 1993, 1-28.

Linn, "Privacy Enhancement for Internet Electronic Mail: Part 1: Message Encryption and Authentication Proc", Network Working Group, Request for Comments 1421, Obsoletes 1113, Feb. 1993, 1-37.

Morrissey, "Demystifying Cisco Access Control Lists, pp. 116, 118 and 120", Network Computing, Apr. 1998.

Myers, et al., "Network Working Group; Internet X.509 Certificate Request Message Format", Mar. 1999.

Spinellis, et al., "Trusted Third Party Services for Deploying Secure Telemedical Applications Over the WWW", Computers & Security, 1999, vol. 18.

Verisign, "Verisign Certification Practice Statement", Verisign CPS, May 15, 1997, Version1.2.

Woo, et al., "A Framework for Distributed Authorization", ACM 1st Conference Computer and Communication Security, Nov. 1993, p. 112-118.

* cited by examiner

ALICE'S CERTIFICATE OF NON-REVOCATION

METHOD AND SYSTEM FOR PROVING MEMBERSHIP IN A NESTED GROUP USING CHAINS OF CREDENTIALS

RELATED CASES

This application discloses subject matter also disclosed in the following copending applications, filed herewith and assigned to Sun Microsystems, Inc., the assignee of this invention:

U.S. patent application entitled "METHOD AND SYSTEM FOR PRESENTATION OF NON-REVOCATION CERTIFICATES", filed concurrently, whose serial number is Ser. No. 09/307,953 which is now U.S. Pat. No. 6,883,100; and U.S. patent application entitled "METHOD AND SYSTEM FOR DYNAMIC ISSUANCE OF GROUP CERTIFICATES", filed concurrently, whose serial number is Ser. No. 09/309,045.

FIELD OF THE INVENTION

This invention relates generally to authorization for a client to access a service in a computer network, and more particularly to the use of group membership and non-membership certificates.

BACKGROUND OF THE INVENTION

During ordinary operation of computer networks it is usual for a client to access a server and to request access to a resource provided by that server. A client may be thought of as a program running on a work station, desktop type computer, personal digital assistant (PDA) or even an embedded device, and a server may be thought of as a program performing a service for a plurality of clients. The client may also be thought of as the computer running the client software, and the server may also be thought of as the computer running the server software. For some purposes, the client may be thought of as a user on whose behalf a request is being made. In some cases, the same computer may run both the client software and the server software. The service is ordinarily provided by the execution of a server program at the request of the client. Specifically, the service provides a resource to the client. The resource may be any operation that is executed, affected or controlled by a computer, such as a word processing or spread-sheet program, the transfer of files, or some other data processing function. The resource access may also include the ability to read or to modify entries in a data base, execute or modify a program maintained by the server, or even modify data maintained by another computer in the system.

In deciding whether or not to grant access to a resource, a resource server must answer two questions:

A. "Is the client correctly identifying himself?" and

B. "Is the identified client authorized to access the requested resource?"

The first question involves a process called "client authentication." The second involves reference to an authorization decision mechanism, such as an Access Control List (ACL) maintained by the server and containing a list of individual clients and/or client groups who are permitted access to the resource. The present invention relates to the determination of group membership or group non-membership of resource-requesting clients.

Client authentication can be accomplished using public key cryptographic methods, as described in *Network Security, Private Communication in a Public World*, Charlie Kaufman, Radia J. Perlman, and Mike Speciner, PTR Prentice Hall, Englewood Cliffs, N.J., 1995, (Kaufman et al.) at chapters 5, and 7 and 8, pages 129–161 and 177–222. Specifically, client Alice can authenticate herself to resource server Bob if she knows her private key and Bob knows Alice's public key. Bob has obtained Alice's public key in an identity certificate from a trusted certification authority or from a certification authority in a chain extending from a trusted authority. Other methods of authentication may be used and the present invention does not depend on which method is used.

An identity certificate may be revoked. One common method of dealing with revocation involves the use of Certificate Revocation Lists (CRLs) which are analogous to the books of revoked credit card numbers that were at one time published and distributed periodically to merchants. Like these books, CRLs suffer from being expensive to distribute and are therefore infrequently distributed. There may also be a significant period of time between certificate revocation and CRL distribution during which the resource server is unaware of the revocation.

For maximum security, the certificate authority may be off-line and therefore inaccessible on a transaction-by-transaction basis. Moreover issuance of an identity certificate may be a relatively lengthy process so that, even if the certificate authority is online, it is impractical to issue an up-to-date certificate for each transaction. An alternative approach to certificate revocation involves the use of on-line revocation servers which maintain lists of revoked identity certificates. With on-line revocation servers, up-to-date revocation status can be determined.

At the same time, if a revocation server's private key has been compromised, the damage will be more limited than if an on-line certification authority's private key were compromised. Specifically, if the certification authority's private key were compromised, the authority might issue new certificates to unauthorized clients. On the other hand, a compromised revocation server would result only in continued access by a client with revoked authorization. A compromised revocation server can never grant unauthorized access to a client who has never had authorized access. Although a compromised revocation server may wrongly revoke an authorized client, the revocation would only be a denial-of-service attack.

The use of on-line revocation servers, which is analogous to the method employed today for the authorization of credit card purchases, is also expensive because the resource server usually contacts an on-line revocation server at each transaction to determine whether the certificate has been revoked. The OCSP (On-line Certificate Status Protocol) Internet draft of the PKIX working group, draft-ietf-pkix-ocsp-07.txt (posted September, 1998, at <http://www.normos.org/ietf/draft/draft-ietf-pkix-ocsp-07.txt>), specifies that the revocation status for each certificate can be retrieved from the revocation server and cached by the resource server verifying that certificate. Although caching improves resource server efficiency, it still places a burden on the resource server which may already be burdened with the processing of resource access requests.

An authentication and authorization arrangement introduced by the Open Software Foundation (OSF) and known as the Distributed Computing Environment (DCE) model has a central database on a machine known as a "privilege server" or "central trusted authority." When a client logs on to the system the privilege server issues a secret, or symmetric, key certificate (as opposed to a public, or asymmetric, key certificate) identifying all the groups of which the client is a member. The client presents this certificate to any server on which the client wishes to access a resource. The resource server has an ACL for the resource, and the ACL includes both authorized clients and client groups. If neither the client nor any one of the groups of which the client is a member is listed in the ACL, client access is denied. This approach saves some work for the server, but requires that a central trusted authority know all the groups of which the client is a member and also that the client's group list is small enough so that presentation of the entire collection is not unwieldy. The DCE model is described in Kaufman et al. at Section 17.7, pages 455–459.

Another approach to authentication and authorization is provided by the Windows NT operating system, a product of the Microsoft Corporation of Redmond, Wash. NT has the concept of "domains" where a local group is known only within that domain, although clients from other domains can be members of a local group. NT also has "global" groups whose members must be individuals (not groups) from one domain. A global group of one domain can be listed as a member of a local group in any other domain having a trust relationship to the first domain. Much like DCE, this approach also uses a central trusted authority.

A more flexible approach is presented in related U.S. patent application entitled "METHOD AND SYSTEM FOR DYNAMIC ISSUANCE OF GROUP CERTIFICATES IN A COMPUTER NETWORK", filed May 10, 1999, whose serial number is Ser. No. 09/309,045 which is now U.S. Pat. No. 6,883,100, wherein on-line group servers capable of making dynamic decisions on group membership and issuing group certificates upon request are employed. These capabilities support the implementation of a "nested" group, wherein a family tree of subgroups extends from the nested group and client membership in the nested group may be proven through client membership in a subgroup of the family tree.

However, there are situations where client membership in a nested group cannot be proven, even though the client is actually a member of a subgroup of the family tree. For example, one or more of the group servers in the family tree may be off-line or may limit the issuance of group certificates to direct group members only. Therefore, an even more flexible approach is needed to provide for the dynamic issuance of nested group certificates.

SUMMARY OF THE INVENTION

In accordance with the invention, a presenter of credentials presents to a recipient of credentials one or more chains of group credentials to prove entity membership or non-membership in a nested group in a computer network. The ability to present a chain of credentials is particularly important when a client is attempting the prove membership or non-membership in a nested group and one or more of the group servers in the family tree are off-line. A chain of group credentials includes two or more proofs of group membership and/or proofs of group non-membership. Furthermore, the proofs of group membership may include one or more group membership certificates and/or one or more group membership lists; and proofs of group non-membership may include one or more group non-membership certificates and/or one or more group membership lists.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Introduction

Figure 1:
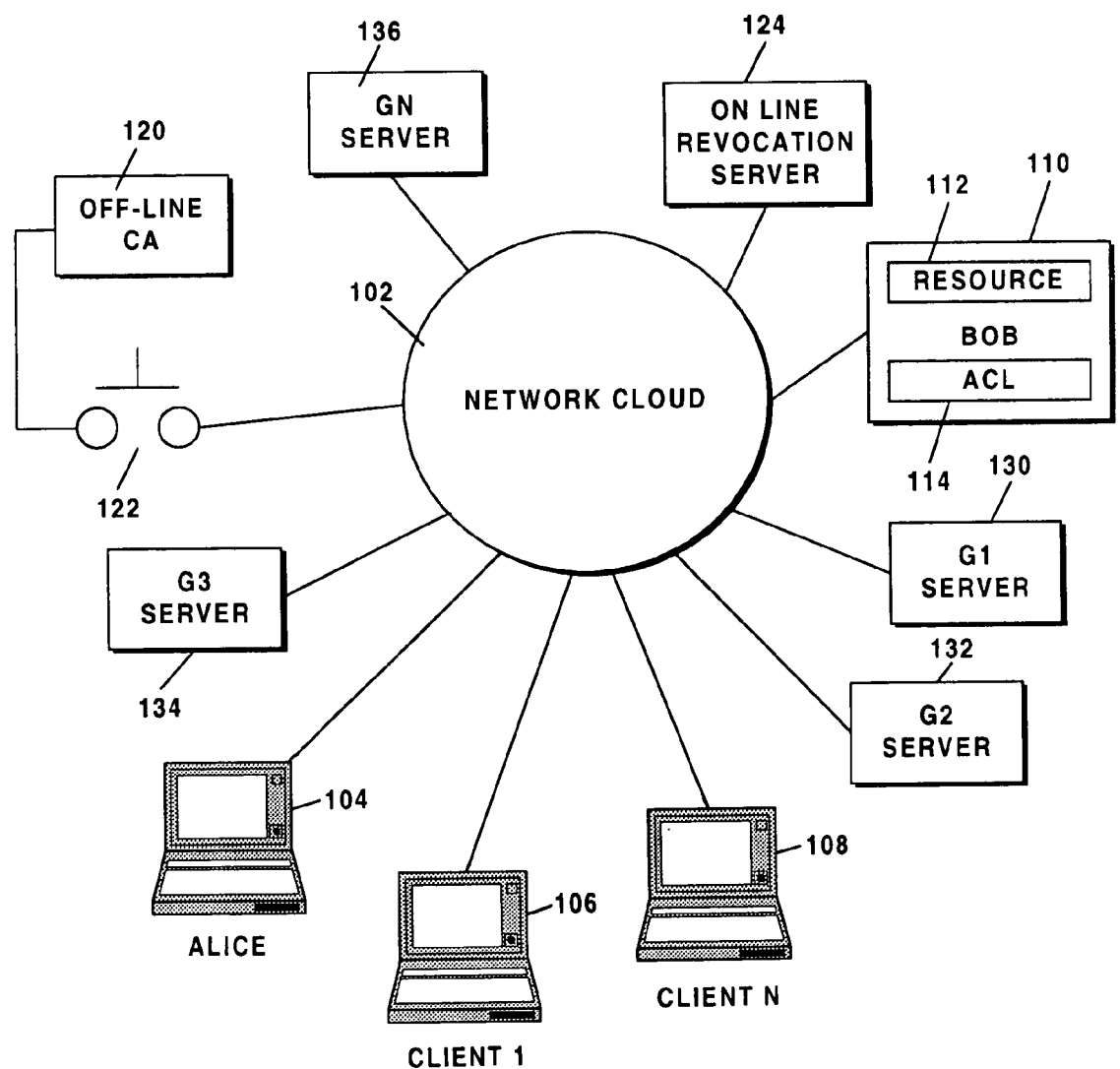
FIG. 1 is a block diagram of a computer network.

The basic concept of the invention is to have a presenter of credentials present to a recipient of credentials one or more chains of group credentials to prove membership or non-membership in a nested group. These chains of group credentials include two or more proofs of group membership and/or group non-membership, such as group certificates and/or group membership lists. The exemplary embodiment is directed to the client-server situation wherein the client is not individually authorized for access to a resource but may gain access by means of a group membership certificate (necessary for access to a particular resource) or a group non-membership certificate (when a group is specifically excluded from access to a resource). These certificates will include time stamps designating the date and time of issue. For each resource that it protects, a resource server typically establishes an expiration period beyond which an issued certificate ceases to be valid.

The presentation of one or more chains of group credentials is not limited to the client-server situation. Any network entity may present credentials, including chains of group credentials, to another network entity. For a given transmission, the entity presenting credentials is defined as a presenter of credentials, and the entity receiving the credentials is defined as a recipient of credentials. A particular entity may be a presenter of credentials in one transmission and a recipient of credentials in a second transmission. For example, Alice and Bob may want to share resources, in which case each would have to present credentials to the other. When Alice transmits credentials to Bob, Alice is a presenter of credentials and Bob is a recipient of credentials. Alternatively, when Bob transmits credentials to Alice, Bob is a presenter of credentials and Alice is a recipient of credentials.

Each group has a name and the location of its group server can thus be obtained from a system directory. The group also has a public key and an associated private key which is used for signing group certificates. Further, a group can have as members individuals and other groups. That is, a "parent", or nested, group may have "child" groups for members. It may even have a complicated Boolean expression for membership, such as G1→(G2 AND G3) AND NOT (G4), meaning that all members of groups G2 and G3 are in the group G1, except for members of group G4.

A group membership or group non-membership certificate usually indicates membership status for a specified name, e.g., client "Alice" is a member of group G1, although the certificate may also indicate membership status for a specified public key or other identity. In most cases, there will be a group membership list associated with a group which will be maintained by an on-line group server. However, the on-line group server may need to dynamically decide whether a given client is a member of the group, i.e. the server may do more than simply refer to a membership list. In the case where there is no group membership list, group membership will be determined by some other criterion. For example, group membership could be determined by a particular attribute of a client. In another case, where the client may be a member of a child group, the online group server may obtain proof of the client's membership in the child group. Alternatively, the client may present the proof of membership in the child group to the on-line group server.

A new group membership certificate can be obtained from an on-line group server at any time and presentation of the certificate to the resource server will be sufficient to prove membership in the group. However, an off-line group server infrequently issues certificates, such as when a client joins the group or when the entire membership list is updated. As a result, the client will request a newly-issued non-revocation certificate from an associated on-line revocation server and present it, along with the group membership certificate, to the resource server.

Group Memberships and Nested Groups

As discussed above, a group may have as its members other groups, or subgroups and the client may contact child group servers to obtain proof of membership in a child group. For example, the aforementioned client Alice may be attempting to access a resource on resource server "Bob". If Alice is not listed as an individual on the resource ACL, but groups G1, G2 and G3 are listed on the ACL, Bob returns to Alice the message:

"Access denied, unless you can prove membership in group G1, G2 or G3."

In contrast to traditional systems, this message does not have to be sent during session establishment (i.e., the initial handshake between the client and the server). It may be the case that Alice had previously established the session with Bob and at this later time has decided to access the resource protected by Bob. At this point Bob may challenge Alice to present additional credentials. Alice may have recently obtained a membership certificate for one of these "root" groups in the course of obtaining access to some other server or for some other reason. If not, the client system can prompt the human operator to provide guidance as to the groups of which the client is likely to be a member. This may save substantial time if there are a large number of groups on the ACL.

If human intervention is not desirable, an exhaustive search may be undertaken: Alice communicates with on-line group servers containing the group membership lists of groups G1, G2 and G3 and attempts to obtain a membership certificate from one of these servers.

In another variation, rather than performing an exhaustive search, Alice may be able to narrow the search by relying on previously stored information to determine groups in which Alice is likely to be a member. For example, if Alice has an old group membership certificate for group G1, Alice can attempt to obtain a new group membership certificate from the G1 group server before undertaking an exhaustive search for a group certificate.

Although Alice may not be listed as a member of group G1, group G1 may be a nested group, i.e., it may be a parent to the child groups, or subgroups, G5 and G6. The G1 server will ask Alice:

"Can you prove membership in group G5 or G6?"

Alice then communicates with the G5 and G6 servers. For example, if group G5 lists Alice as a member, the G5 server returns a group membership certificate in group G5. Alice returns to the G1 server to request a group membership certificate, armed with the certificate from the G5 server. The G1 server then grants Alice a group membership certificate. Now, armed with the certificate from root group G1, Alice can go to Bob and obtain access to the requested resource. A group membership certificate is not the only mechanism by which Alice may prove membership in group G5 to the G1 server. For example, Alice may alternatively present the group G5 membership list, signed by group G5, or some other proof of group membership.

The example presented above is rather simple. In some cases, Alice will be unable to establish membership in either a root or a child group and will be denied access to the resource. In other cases, Alice may have to search down several subgroup levels before finding membership in a group. To facilitate this task, Alice maintains a family tree for each root group, tracing the path of subgroups visited during a search. Alice can easily detect and abort loops (where G5 is a member of G1 is a member of G5 is a member of G1 and so on). When membership in a subgroup is found, Alice moves back up the path collecting a group membership certificate from each successive group server and presenting it to the next higher group server until the root group is reached. Alice then presents to Bob the group membership certificate issued by the root group server.

In the above scenario, it has been assumed that the group servers issuing group membership certificates are on-line and thus create newly-issued group certificates at runtime. In that case, the group membership certificates created at runtime are fresh enough so as not to need any further proof of non-revocation. If a group certificate is "old", i.e., it was obtained by the client more than some specified time prior to a request for access to a resource, as ascertained from a time stamp included in the certificate, the resource server will require a newly-issued certificate from the on-line group server.

If the root group server is off-line, the client may obtain from an on-line source, such as a directory, a certificate stating that the client, or a subgroup, is a member of the root group. The client will then request a corresponding non-revocation certificate from an on-line revocation server. In the above example, if the G1 server is off-line, Alice will assure Bob that the certificate designating group G5 as a member of group G1 has not been revoked, i.e. Alice will retrieve a newly-issued non-revocation certificate from the group G1 on-line revocation server. When the client is a member of a subgroup and the root group server is off-line, the client will present a chain of two or more group membership certificates to the resource server. Additionally, the client will present a valid non-revocation certificate from the appropriate on-line revocation server for the group membership certificate issued by the off-line root group server. If the next lower group server is also off-line, the client will also present a valid non-revocation certificate from the appropriate on-line revocation server for the group membership certificate issued by the off-line subgroup group server. The chain continues until it includes either a group membership certificate issued by the highest level on-line group server in the family tree, or the group membership and non-revocation certificates for all subgroups down to the lowest level group in the family tree. In the present example, Alice will present to Bob the certificate designating group G5 as a member of group G1 and its corresponding non-revocation certificate, and will also present a group membership certificate issued by the on-line G5 server designating Alice as a member of group G5. Similarly, if a group server is on-line, but its subgroup servers are off-line, Alice may need to present a chain of group membership certificates to the on-line group server in order to prove membership in a subgroup.

In a different example, the G1 group server may grant membership to anyone who can prove membership in group G11 and non-membership in group G12. Accordingly, Alice will retrieve a group membership certificate from the G11 group server and a group non-membership certificate from the G12 group server and present those certificates to the G1 group server. The G1 group server will then issue a G1 group membership certificate which Alice will present to Bob. If the G1 group server is off-line, Alice will need to present to Bob two chains of credentials, including proofs of group membership and non-membership. Specifically, Alice will need to present to Bob a first chain including a group G1 membership list (signed by G1), along with the group membership certificate from group G11, and a second chain including the signed group G1 membership list, along with the group non-membership certificate from group G12. In this case, because Alice does not need to twice present the signed group G1 membership list, Alice simply presents the signed group G1 membership list, along with the group G11 membership certificate and the group G12 non-membership certificate. Thus, in order to prove membership in a nested group, Alice will sometimes need to present both proofs of group membership and proofs of group non-membership.

Group Non-membership Certificates

A resource server may also prohibit access to a resource based on client membership in one or more groups. In this case, the client will gather and present group non-membership certificates stating that the client is not a member of the designated groups. For example, group G1 members may be permitted access to a resource, unless they are also group G2 members. Alice will have to prove both membership in group G1 and NON-membership in group G2. To prove non-membership in group G2, Alice will present a group G2 non-membership certificate to Bob. Alice requests a non-membership certificate from the G2 group server and presents the certificate, along with a group G1 membership certificate to Bob.

The work required to gather the credentials necessary to prove group non-membership is more intensive than that required for group membership. For each prohibited root group, the client will be required to prove non-membership in each and every group extending from the root. For example, Bob may deny resource access to all members of group G2. Therefore, Alice will request a group non-membership certificate from the G2 server. The root group G2 might have as members the child groups, or subgroups, G7 and G8. The G2 group server will ask Alice:

"Can you prove non-membership in groups G7 and G8?"

Alice then requests a group non-membership certificate from both the G7 and G8 servers. If group G7 also lists the groups G9 and G10, Alice requests a group non-membership certificate from both the G9 and G10 servers. Alice presents the G9 and G10 group non-membership certificates to the G7 server which then issues a group non-membership certificate. Alice next presents the G7 and G8 group non-membership certificates to the G2 server and receives a G2 group non-membership certificate. Now, armed with a group non-membership certificate from group G2, Alice can go to Bob and prove non-membership in root group G2.

The case of off-line group servers becomes more difficult when trying to prove non-membership in a nested group. For example, if in the above example the G2, G7, and G8 group servers are off-line, Alice will need to present a chain of credentials to Bob, including proofs of both group membership and group non-membership. Specifically, Alice may present to Bob a group G2 membership list (signed by G2), a group G7 membership list (signed by G7) and a group G8 membership list (signed by G8). From these credentials, Bob will be aware of the memberships of groups G2, G7 and G8, and Bob will be able to indirectly verify that Alice is not a member of any of these groups. In particular, Bob will know that group G7 lists groups G9 and G10 as members. Therefore, in order to prove non-membership in group G7, Alice will also need to present to Bob group non-membership certificates for the groups G9 and G10.

An Embodiment of the Invention

As shown in FIG. 1, a computer network 100 includes a network "cloud" 102 that provides the interconnection for devices on the network. The network cloud 102 may represent a simple local area network, for example, an Ethernet on one floor of a building. At the other extreme, it may represent the entire worldwide Internet. The network cloud 102 may contain transmission lines, repeaters, routers, network backbones, network interconnect points, etc., depending upon the extent of the network which it represents.

A client can be any device capable of sending messages over the network and is generally thought of as an individual workstation, a desk-top computer, a mini-computer accessed by a terminal, a personal digital assistant (PDA), an embedded device, or some other relatively simple computer. A client is often a computer operated by one person, although an independently operating computer or a program operating without human intervention can also be a client. Client computer Alice 104 and two additional client computers 106, 108 are shown connected to the network cloud 102. A modem network may include thousands of client computers.

A resource server Bob 110 is also connected to network cloud 102. A resource server can be any device capable of receiving messages over a network and is usually thought of as a larger computer which contains resources to which client computers desire access. For example, a resource may be a data base, a file system, etc. A resource 112 on resource server Bob 110 represents any resource to which a client may desire access. An Access Control List (ACL) 114 contains a list of clients which are permitted to access the resource 112. As a convenience, clients may be assigned membership in groups of clients, designated groups G1, G2, G3, . . . , GN, having associated group servers 130, 132, 134, 136. Accordingly, ACL 114 may also contain the names of groups whose member clients are permitted access to the resource 112.

An Off-line Certification Authority (OCA) server 120 issues identity certificates used by clients to identify themselves when seeking access to various resources on various servers, such as client Alice 104 access to resource 112. A switch 122 represents the ability of the OCA server 120 to be temporarily connected to the network cloud 102 so that it may, at selected times, issue an identity certificate to a client. The switch 122 is in "open" position most of the time to protect the OCA server 120 from attacks by malicious persons.

An On-line Revocation (OR) server 124 is connected to network cloud 102 on a substantially permanent basis. The OR server 124, upon request from a client, issues a non-revocation certificate stating that a particular client's identity certificate, previously issued by the OCA server 120, has not been revoked as of the time stamp. The non-revocation certificate is then transmitted to the requesting client.

Figure 2:
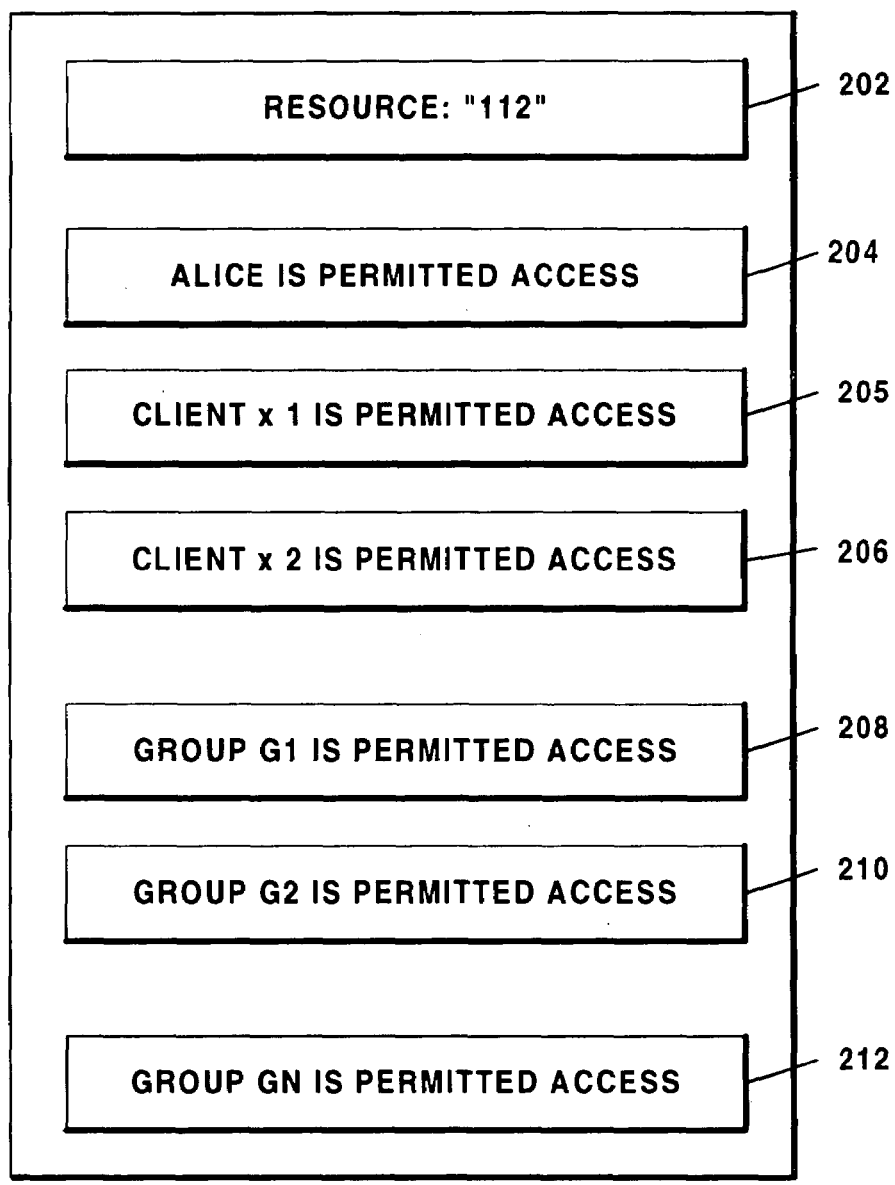
FIG. 2 is an example of an Access Control List (ACL)

FIG. 2 shows a typical Access Control List (ACL) 200 having a name field 202, in this case "112", and access entries. The first access entry 204 specifies that client Alice 104 is permitted access. Additional access entries for client computers x1 and x2 205, 206, along with groups G1, G2 and GN 208, 210, 212, round out the list.

Figure 3:
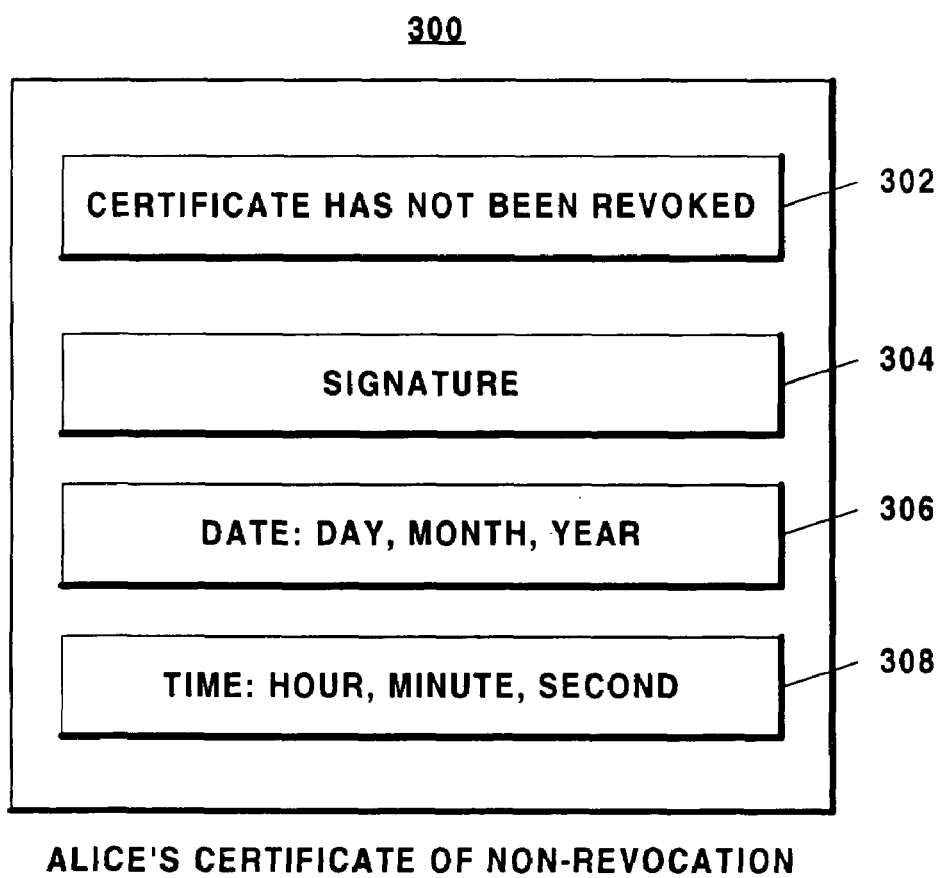
FIG. 3 is an example of a non-revocation certificate.

FIG. 3 shows a typical non-revocation certificate 300 issued to client Alice 104 by the OR server 124. Client Alice 104 had previously obtained a certificate from the OCA server 120. The OR server 124 maintains a list of certificates which have been revoked. Upon receipt of a request from a client, the OR server 124 checks its revocation list and, assuming that the subject certificate is not on that list, issues a non-revocation certificate. The first entry 302 in the non-revocation certificate 300 indicates that a previously issued certificate for client Alice 104 has not been revoked. Additionally, the non-revocation certificate 300 includes a signature entry 304, and a time stamp comprising an issue date entry 306 and time entry 308.

Resources may have recency requirements for credentials, such as non-revocation certificates, group membership certificates and group non-membership certificates. For example, resource server Bob 110 may require that the credentials used to access the resource 112 be no more than one-day old, or possibly no more than 10 minutes old, depending upon the level of security desired for the resource 112, the number of clients requesting the resource 112, and the number of requests which OR server 124 can handle.

Figure 4:
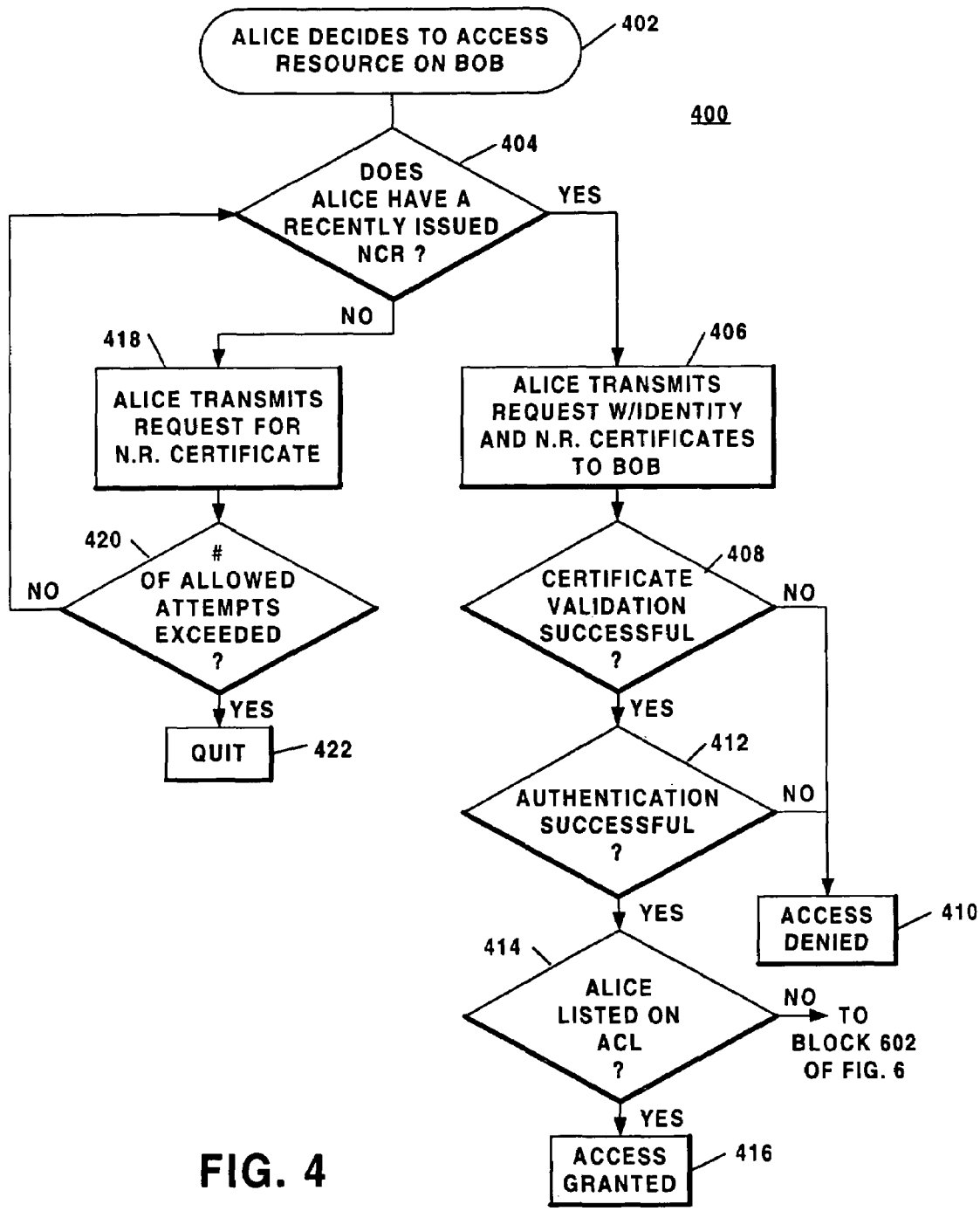
FIG. 4 is a flow diagram of a client access authorization procedure.

FIG. 4 is an illustrative flow diagram 400 of the client access authorization procedure. Each entity on the computer network includes a processor with an associated memory which may contain instructions for performing one or more steps of the procedure. Persistent storage of these instructions may be in a server system remote from the network entity and its processor. The electrical signals that carry digital data representing the instructions are exemplary forms of carrier waves used for transporting information from a server system to a network entity. At block 402 client Alice 104 "decides" to request access to the resource 112. For example, the decision may be initiated by a human typing the appropriate command, or clicking a cursor on an appropriate icon, etc. In an alternative example, client Alice 104 may have an internal timer or other event that prompts it to make a request for the resource 112.

At decision block 404 client Alice 104 determines whether it has a recently-issued non-revocation certificate issued by a trusted authority, or a set of non-revocation certificates each corresponding to a particular identity certificate. A recently-issued certificate may be stored in the cache, for example, as the result of an earlier request for access to the resource 112.

If client Alice 104 has a recently-issued non-revocation certificate, it transmits an access request over the computer network 100 to resource server Bob 110, along with its identity and non-revocation certificates, at block 406.

At decision block 408 resource server Bob 110 attempts to validate the identity and non-revocation certificates presented at block 406. For each identity certificate, resource server Bob 110 determines whether the corresponding non-revocation certificate is valid. The validity of the non-revocation certificate is determined by verifying its signature and by further verifying that its time stamp falls within the recency requirements for the resource. If the validation fails, access is denied at block 410.

If the validation of the certificates is successful, at decision block 412 resource server Bob 110 attempts to authenticate client Alice 104. As described above, a variety of authentication methods may be employed by resource server Bob 110. If the authentication fails, access is denied at block 410.

If the authentication of client Alice 104 is successful, at decision block 414 resource server Bob 110 determines whether client Alice 104 is listed on the resource ACL 200. If client Alice 104 is listed, access is granted at block 416. Otherwise, the procedure branches to decision block 602 of the flow diagram 600 of FIG. 6.

If at decision block 404, client Alice 104 does not have a recently-issued non-revocation certificate, client Alice 104 requests a new non-revocation certificate from the OR server 124 at block 418. In response, the OR server 124 checks its list of revoked identity certificates, and if client Alice 104 does not appear on the list of revoked certificates, the OR server 124 issues a non-revocation certificate. Client Alice 104 may store a copy of the non-revocation certificate in its cache for use whenever it desires access to a resource.

Client Alice 104 is allowed a specified number of attempts (e.g. 5) to obtain a non-revocation certificate from OR server 124 before the process aborts. It is desirable to permit such attempts because network congestion, server congestion, or similar problems may cause inadvertent failures. If the specified number of attempts is exceeded at decision block 420, then no further attempts are allowed and the access authorization procedure terminates at block 422. Human intervention may reset the revocation list in OR server 124. In an exemplary embodiment of the invention, the OR server 124 will simply not respond in the event that the identity certificate for client Alice 104 has been revoked. Accordingly, decision block 420 is necessary to shut down requests from client Alice 104. In an alternative embodiment of the invention, a message stating that the identity certificate has been revoked is returned to client Alice 104 from the OR server 124. This message can be added to decision block 420 to bring the procedure to a halt before the number of attempts is exceeded.

In summary, the computer network 100, the ACL 200 of the resource 112 of resource server Bob 110, the issuance of identity certificates by the OCA server 120, the issuance of non-revocation certificates by the OR server 124, and the exemplary access authorization procedure traced by the flow diagram 400 provide a secure and scaleable security system. The work of gathering non-revocation certificates is handled by the clients, and a resource server is not burdened with checking revocation status for each of the respective clients that request access to resources.

Groups of Computers and Nested Groups

Figure 5:
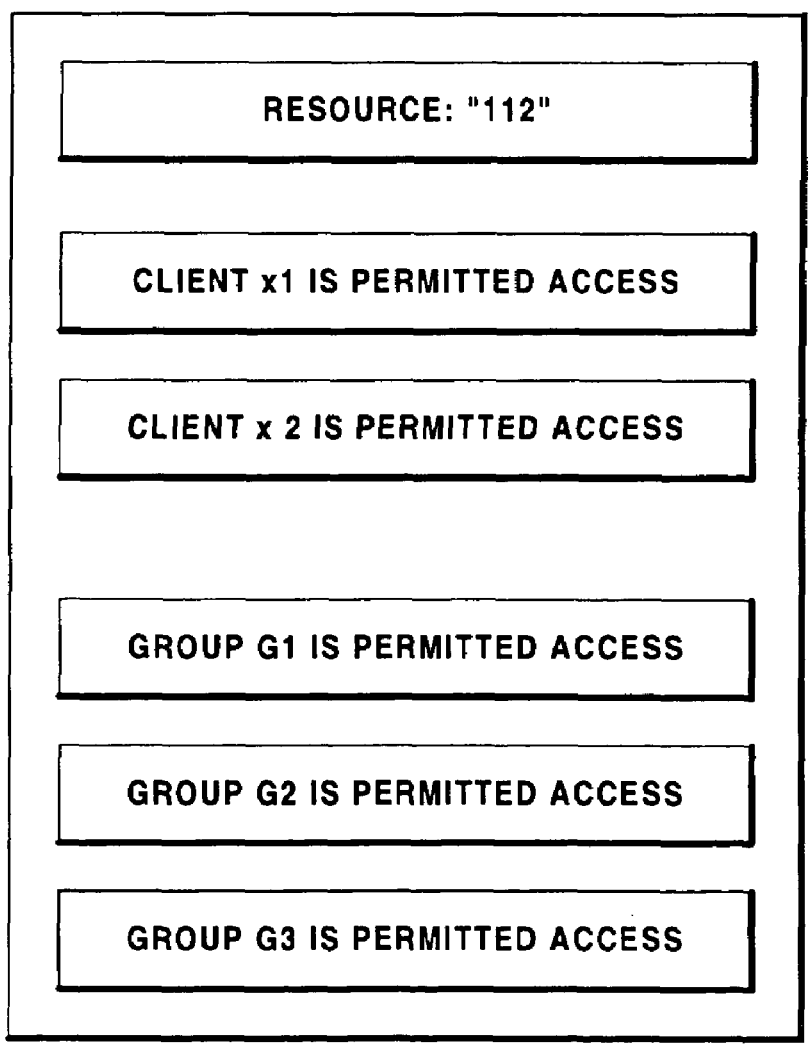
FIG. 5 is a second example of an ACL.

FIG. 5 illustrates an ACL 500 for resource server Bob 110 in which client Alice 104 is not listed individually. Instead, ACL 500 identifies groups G1, G2 and G3 as having authenticated access to the resource 112. Any client which can prove that it is a member of a group having authenticated access to the resource 112 has access individually.

Figure 6:
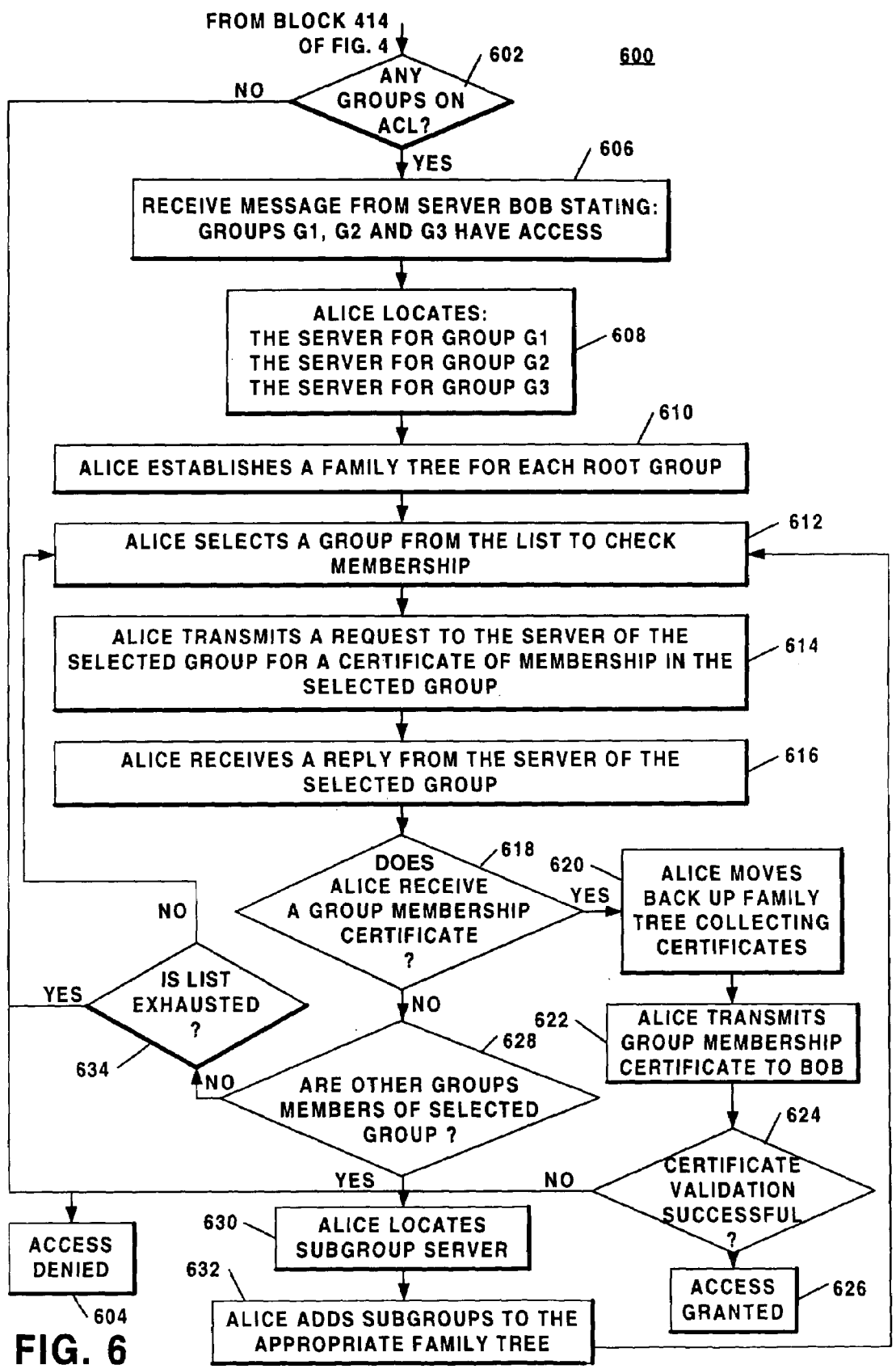
FIG. 6 is a flow diagram of a group membership access authorization procedure.

FIG. 6 is an illustrative flow diagram 600 of the group membership access authorization procedure. Again, each entity on the computer network includes a processor with an associated memory which may contain instructions for performing one or more steps of the procedure. If client Alice 104 can prove that it is a member of either a listed group or a sub-group of a listed group, then it is authenticated for access to the resource 112. Decision block 602 is entered by transfer from decision block 414 of the client access authorization procedure shown in FIG. 4. The resource server Bob 110 has determined at block 414 that client Alice 104 is not listed on the ACL for resource 112 and therefore does not have an individual client authorization for access.

If at decision block 602, the ACL 500 did not list any groups with authorization for access to the resource 112, the procedure terminates at block 604. In the present example, however, at block 606 resource server Bob 100 returns a message to client Alice 104 stating that groups G1, G2, and G3 have access to the resource 112.

At block 608 client Alice 104 searches for and locates the address of the G1 server 130 which maintains the membership list for group G1; the address of the G2 server 132 which maintains the membership list for group G2; and, finally, the address of the G3 server 134 which maintains the membership list for group G3.

At block 610 client Alice 104 establishes a family tree for each root group designated by resource server Bob 110 at block 606 as having resource access. Below, at block 632, additional groups may be added to the family tree when a parent identifies one or more child groups, or subgroups. This addition is recursive and subgroups continue to be added to the family tree maintained at block 610 until client Alice 104 proves membership in a group or all subgroups have been identified.

At block 612 one root group is selected for determination of its membership list. The group may be selected by any useful criterion, for example, alphabetical by group name, numerical by address, or by the order in which the groups were added to the list, etc.

At block 614 client Alice 104 transmits to the group server selected in block 612 a request for a membership certificate stating that client Alice 104 is a member of the group. At block 616, client Alice 104 receives a reply to the request sent out at block 614.

If at decision block 618 client Alice 104 does not receive a group membership certificate, it is then determined at decision block 628 whether any other groups are members of the selected group. At block 630 client Alice 104 locates the group servers for any identified subgroups and at block 632 these subgroups are added to the appropriate family tree maintained at block 610.

If at decision block 628 no additional groups are determined to be members of the family tree of the selected root group, and if at decision block 634 all of the root groups maintained at block 610 have been checked, client Alice 104 does not have access through group membership and the procedure terminates at block 604.

If at decision block 634 all root groups maintained at block 610 have not been is checked, the next root group is selected at block 612. The new group selected is then investigated in order to determine if client Alice 104 is a member of that group or any subgroup. The procedure continues until all identified root groups and their family trees have been investigated.

If at decision block 618 client Alice 104 receives a group membership certificate, client Alice 104 moves back up the family tree, presenting a certificate of membership in each child group to each higher level parent group server at block 620. At block 622 client Alice 104 transmits to resource server Bob 110 the group membership certificate associated with the highest group in the chain, i.e. the root group authorized for access on the resource ACL 114.

At decision block 624 resource server Bob 110 attempts to validate the group certificate presented at block 622. The validity of the group certificate is determined by verifying its signature and by further verifying that its time stamp falls within the recency requirements for the resource. If the validation fails, access is denied at block 604, otherwise access is granted at block 626.

Figure 7:
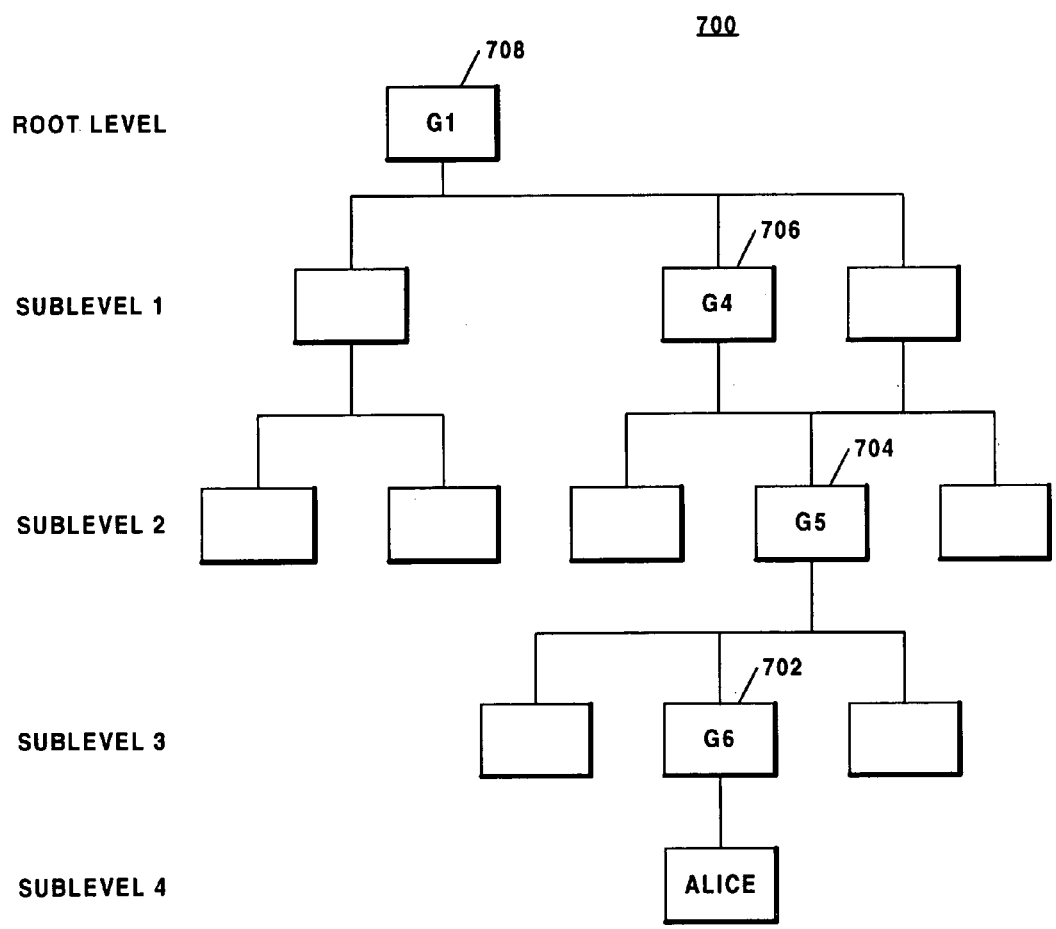
FIG. 7 is an example of a group family tree.

An exemplary family tree maintained by client Alice 104 is shown in FIG. 7. It has been determined from the procedure that client Alice 104 is an individual member of group G6, as shown at the first entry 702. It has also been determined that group G6 is a member of group G5, as shown at the second entry 704; group G5 is a member of group G4, as shown at the third entry 706; and group G4 is a member of group G1, as shown at the fourth entry 708. As a member of group G6 it can prove membership in group G5. Next, as a member of group G5 it can prove membership in group G4. Finally, as a member of group G4 it can prove membership in group G1.

If all the group servers are on-line, client Alice 104 may present to resource server Bob 110 only the group membership certificate for group G1. If the G1 server 130 is off-line, client Alice 104 will present a certificate stating that group G4 is a member of group G1, a corresponding non-revocation certificate from an on-line revocation server (not shown) associated with group G1, and a group membership certificate from the on-line G4 server (not shown). If the G4 server is also off-line, client Alice 104 will present the is certificate stating that group G4 is a member of group G1 and the corresponding non-revocation certificate, a certificate stating that group G5 is a member of group G4 and a corresponding non-revocation certificate from an on-line revocation server (not shown) associated with group G4, and a group membership certificate from the on-line G5 server (not shown).

Boolean Logic

Examples of the use of Boolean logic to control access of various subgroups to access to the resource 112 were given above. The process flow diagram 600 of FIG. 6, and the resulting credentials which client Alice 104 presents to resource server Bob 110, give the resource server Bob 110 the tools to implement a Boolean logic process to limit access to the resource.

For example, resource server Bob 110 may refuse access to the resource 112 if client Alice 104 is a member of some suspect group. By having the group server responsible for the membership list for the suspect group issue a non-membership certificate, resource server Bob 110 can implement Boolean logic to prevent any client unable to present a non-membership certificate from accessing the resource. For example, if all members of group G3 are denied access to the resource and members of groups G1 and G2 are permitted access to the source, then the Boolean expression:

(G1 AND G2) AND NOT (G3)

will be FALSE in the event that resource server Bob 110 does not receive a valid non-membership certificate indicating that client Alice 104 is not a member of group G3. The FALSE result in the Boolean expression will prevent client Alice 104 from gaining access to the requested resource on resource server Bob 110.

The foregoing description has been directed to client access to a server resource. The present invention, however, can be applied to any computer network transmission, such as an e-mail message, where authorization is returned. In addition, a typical network device may assume either the client or resource server role, i.e., it may be a client in one resource access and a server in another resource access. The foregoing description has also been directed to use of an ACL for client authorization decisions. The present invention, however, can employ many other authorization decision mechanisms known in the art. The foregoing description has been further directed to use of non-revocation certificates for revocation decisions. The present invention, however, can employ many other revocation decision mechanisms known in the art, such as CRLs, or it may not even employ a revocation decision mechanism.

The foregoing description has also been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of controlling access by a client to a resource that is controlled by a resource server and is made available to members of a nested group, the method comprising:
    (a) presenting from the client to the resource server a first request to access the resource;
    (b) in response to the first request, sending a challenge from the resource server to the client to prove membership in the nested group;
    (c) in response to the challenge, performing a search at the client to obtain a chain of group credentials that proves membership in the nested group; and
    (d) presenting from the client to the resource server a second request to access the resource, the second request including the chain of group credentials.

2. The method of claim 1 wherein membership in each group is controlled by a group server and wherein step (c) comprises contacting with the client at least one group server to obtain therefrom group credentials proving membership in the group controlled by that server.

3. The method of claim 2 wherein step (c) further comprises providing from the client to the at least one group server group credentials proving membership in a group nested in the group controlled by that server.

4. The method of claim 1, wherein one of said chains of group credentials comprise one or more proofs of group membership.

5. The method of claim 4, wherein said proofs of group membership comprise one or more group membership certificates.

6. The method of claim 4, wherein said proofs of group membership comprise one or more group membership lists.

7. The method of claim 1, wherein one of said chains of group credentials comprise one or more proofs of group non-membership.

8. The method of claim 7, wherein said proofs of group non-membership comprise one or more group non-membership certificates.

9. The method of claim 7, wherein said proofs of group non-membership comprise one or more group membership lists.

10. A method of controlling access by a client to a resource that is controlled by a resource server and is made available to non-members of a nested group, the method comprising:
    (a) presenting from the client to the resource server a first request to access the resource;
    (b) in response to the first request, sending a challenge from the resource server to the client to prove non-membership in the nested group;
    (c) in response to the challenge, performing a search at the client to obtain a chain of group credentials that proves non-membership in the nested group; and
    (d) presenting from the client to the resource server a second request to access the resource, the second request including the chain of group credentials.

11. The method of claim 10 wherein membership in each group is controlled by a group server and wherein step (c) comprises contacting with the client at least one group server to obtain therefrom group credentials proving non-membership in the group controlled by that server.

12. The method of claim 11 wherein step (c) further comprises providing from the client to the at least one group server group credentials proving non-membership in a group nested in the group controlled by that server.

13. The method of claim 10, wherein one of said chains of group credentials comprise one or more proofs of group membership.

14. The method of claim 13, wherein said proofs of group membership comprise one or more group membership certificates.

15. The method of claim 13, wherein said proofs of group membership comprise one or more group membership lists.

16. The method of claim 10, wherein one of said chains of group credentials comprise one or more proofs of group non-membership.

17. The method of claim 16, wherein said proofs of group non-membership comprise one or more group non-membership certificates.

18. The method of claim 16, wherein said proofs of group non-membership comprise one or more group membership lists.

19. A computer system having a resource to which a client desires access and which is controlled by a resource server so that the resource is made available to members of a nested group, the system comprising:
    a mechanism in the client that presents to the resource server a first request to access the resource;
    a mechanism in the resource server and operable in response to the first request, that sends a challenge to the client to prove membership in the nested group;
    a mechanism in the client and operable in response to the challenge, that performs a search to obtain a chain of group credentials that proves membership in the nested group; and
    a mechanism in the client that presents to the resource server a second request to access the resource, the second request including the chain of group credentials.

20. The system of claim 19 wherein membership in each group is controlled by a group server and wherein the mechanism that obtains a chain of group credentials comprises a mechanism that contacts at least one group server to obtain therefrom group credentials proving membership in the group controlled by that server.

21. The system of claim 20 wherein the mechanism that obtains a chain of group credentials further comprises a mechanism that provides to the at least one group server group credentials proving membership in a group nested in the group controlled by that server.

22. The system of claim 19, wherein one of said chains of group credentials comprise one or more proofs of group membership.

23. The system of claim 22, wherein said proofs of group membership comprise one or more group membership certificates.

24. The system of claim 22, wherein said proofs of group membership comprise one or more group membership lists.

25. The system of claim 19, wherein one of said chains of group credentials comprise one or more proofs of group non-membership.

26. The system of claim 25, wherein said proofs of group non-membership comprise one or more group non-membership certificates.

27. The system of claim 25, wherein said proofs of group non-membership comprise one or more group membership lists.

28. A computer system having a resource to which a client desires access and which is controlled by a resource server so that the resource is made available to non-members of a nested group, the system comprising:
- a mechanism in the client that presents to the resource server a first request to access the resource;
- a mechanism in the resource server and operable in response to the first request, that sends a challenge to the client to prove non-membership in the nested group;
- a mechanism in the client and operable in response to the challenge, that performs a search to obtain a chain of group credentials that proves non-membership in the nested group; and
- a mechanism in the client that presents to the resource server a second request to access the resource, the second request including the chain of group credentials.

29. The system of claim 28 wherein membership in each group is controlled by a group server and wherein the mechanism that obtains a chain of group credentials comprises a mechanism that contacts at least one group server to obtain therefrom group credentials proving non-membership in the group controlled by that server.

30. The system of claim 29 wherein the mechanism that obtains a chain of group credentials further comprises a mechanism that provides to the at least one group server group credentials proving non-membership in a group nested in the group controlled by that server.

31. The system of claim 28, wherein one of said chains of group credentials comprise one or more proofs of group membership.

32. The system of claim 31, wherein said proofs of group membership comprise one or more group membership certificates.

33. The system of claim 31, wherein said proofs of group membership comprise one or more group membership lists.

34. The system of claim 28, wherein one of said chains of group credentials comprise one or more proofs of group non-membership.

35. The system of claim 34, wherein said proofs of group non-membership comprise one or more group non-membership certificates.

36. The system of claim 34, wherein said proofs of group non-membership comprise one or more group membership lists.

37. A client device on a computer network, said client device configured for requesting one or more resources from a server on the network, in which access to said resources is so controlled by said server as to make them available to members of a nested group, said client device comprising:
- A. means for presenting to the server a first request to access the resource;
- B. means operable in response to a challenge from the server generated by the first request for performing a search to obtain one or more chains of group credentials that prove client membership in the nested group, and
- C. means for transmitting to the server a second request for one or more of the resources, said second request including the one or more chains of group credentials that prove client membership in the nested group.

38. The client device of claim 37, wherein one of said chains of group credentials comprise one or more proofs of group membership.

39. The client device of claim 38, wherein said proofs of group membership comprise one or more group membership certificates.

40. The client device of claim 38, wherein said proofs of group membership comprise one or more group membership lists.

41. The client device of claim 37, wherein one of said chains of group credentials comprise one or more proofs of group non-membership.

42. The client device of claim 41, wherein said proofs of group non-membership comprise one or more group non-membership certificates.

43. The client device of claim 41, wherein said proofs of group non-membership comprise one or more group membership lists.

44. A client device on a computer network, said client device configured for requesting one or more resources from a server on the network, in which access to said resources is so controlled by said server as to make them available to non-members of a nested group, said client device comprising:
- A. means for presenting to the server a first request to access the resource,
- B. means operable in response to a challenge from the server generated by the first request for performing a search to obtain one or more chains of group credentials that prove client non-membership in the nested group, and
- C. means for transmitting to the server a second request for one or more of the resources, said second request including the one or more chains of group credentials that prove client non-membership in the nested group.

45. The client device of claim 44, wherein one of said chains of group credentials comprise one or more proofs of group membership.

46. The client device of claim 45, wherein said proofs of group membership comprise one or more group membership certificates.

47. The client device of claim 45, wherein said proofs of group membership comprise one or more group membership lists.

48. The client device of claim 44, wherein one of said chains of group credentials comprise one or more proofs of group non-membership.

49. The client device of claim 48, wherein said proofs of group non-membership comprise one or more group non-membership certificates.

50. The client device of claim 48, wherein said proofs of group nonmembership comprise one or more group membership lists.

51. A computer program product comprising a computer usable medium having thereon computer readable program code representing a sequence of instructions that, when executed by a processor in a network device requesting one or more resources from a server, in which access to said resources is so controlled by said server as to make them available to members of a nested group, configures the network device to operate as a client device that:
- A. presents to the server a first request to access the resource, B. in response to a challenge from the server generated by the first request performs a search to obtain one or more chains of group credentials that prove client membership in the nested group, and C. transmits to the server a second request for one or more resources, said second request including the one or more chains of group credentials that prove membership in the nested group.

52. The computer program product of claim 51, wherein one of said chains of group credentials comprise one or more proofs of group membership.

53. The computer program product of claim 52, wherein said proofs of group membership comprise one or more group membership certificates.

54. The computer program product of claim 52, wherein said proofs of group membership comprise one or more group membership lists.

55. The computer program product of claim 51, wherein one of said chains of group credentials comprise one or more proofs of group non-membership.

56. The computer program product of claim 55, wherein said proofs of group non-membership comprise one or more group non-membership certificates.

57. The computer program product of claim 55, wherein said proofs of group non-membership comprise one or more group membership lists.

58. A computer program product comprising a computer usable medium having thereon computer readable program code representing a sequence of instructions that, when executed by a processor in a network device requesting one or more resources from a server, in which access to said resources is so controlled by said server as to make them available to non-members of a nested group, configures the network device to operate as a client device that:

A. presents to the server a first request to access the resource,

B. in response to a challenge from the server generated by the first request performs a search to obtain one or more chains of group credentials that prove client non-membership in the nested group, and C. transmits to the server a second request for one or more resources, said second request including the one or more chains of group credentials that prove non-membership in the nested group.

59. The computer program product of claim 58, wherein one of said chains of group credentials comprise one or more proofs of group membership.

60. The computer program product of claim 59, wherein said proofs of group membership comprise one or more group membership certificates.

61. The computer program product of claim 59, wherein said proofs of group membership comprise one or more group membership lists.

62. The computer program product of claim 58, wherein one of said chains of group credentials comprise one or more proofs of group non-membership.

63. The computer program product of claim 62, wherein said proofs of group non-membership comprise one or more group non-membership certificates.

64. The computer program product of claim 62, wherein said proofs of group non-membership comprise one or more group membership lists.

* * * * *